United States Patent [19]

Hunt et al.

[11] Patent Number: 5,400,322
[45] Date of Patent: Mar. 21, 1995

[54] UPDATING OF BIT ALLOCATIONS IN A MULTICARRIER MODULATION TRANSMISSION SYSTEM

[75] Inventors: Ronald R. Hunt, San Jose; Peter S. Chow, Mountain View, both of Calif.

[73] Assignee: Amati Communications Corp., Mountain View, Calif.

[21] Appl. No.: 109,489

[22] Filed: Aug. 20, 1993

[51] Int. Cl.$^6$ .............................................. H04J 1/14
[52] U.S. Cl. ...................................... 370/19; 370/76; 370/121
[58] Field of Search ...................... 370/17.19, 23, 69.1, 370/120, 121, 71, 84; 375/15, 1; 379/24

[56] References Cited

U.S. PATENT DOCUMENTS 5,023,869  6/1991  Grover et al. ......................... 370/84
5,293,401  3/1994  Serfaty ................................... 375/13

OTHER PUBLICATIONS

Bingham, J., "Multicarrier Modulation for Data Transmission: An Idea Whose Time Has Come," *IEEE Communications Magazine*, vol. 28, No. 5, pp. 5–14 (May 1990).

Fleming, S. et al., ADSL: "The On-Ramp to the Information Highway", *Telephony*, pp. 20–26 (Jul. 12, 1993).

*Primary Examiner*—Melvin Marcelo
*Attorney, Agent, or Firm*—Foley & Lardner

[57] ABSTRACT

Allocations of bits per transmission symbol to subchannels in a transmission system using multicarrier modulation are updated in response to requests from a receiver to a transmitter of the system, each request identifying a carrier whose bit allocation can be increased and a carrier whose bit allocation can be decreased, so that the total number of bits per symbol can be increased, decreased, or be unchanged. In order to synchronize bit allocation changes, a transmitted symbol counter at the transmitter and a received symbol counter at the receiver maintain synchronized symbol counts. In response to a request for a change in bit allocations, the transmitter sends a future symbol count value to the receiver, and the transmitter and the receiver implement the change when their respective counters match this count value.

20 Claims, 3 Drawing Sheets

UPDATING OF BIT ALLOCATIONS IN A MULTICARRIER MODULATION TRANSMISSION SYSTEM

This invention relates to transmission systems using multicarrier modulation, also known as discrete multitone (DMT) modulation where, as is desirable, the modulation is effected using a discrete Fourier Transform.

RELATED APPLICATIONS

U.S. patent application Ser. No. 08/057,301 filed May 3, 1993 by Peter S. Chow et al., entitled "Method And Apparatus For Adaptive, Variable Bandwidth, High-Speed Data Transmission Of A Multicarrier Signal Over Digital Subscriber Lines", discloses a procedure for initializing bit allocations in a transmission system using multicarrier modulation, and proposes an adaptive updating procedure for such allocations.

U.S. patent application Ser. No. 08/107,200, filed Aug. 17, 1993 by John M. Cioffi et al., entitled "Multicarrier Modulation Transmission System With Variable Delay", discloses a transmission system using multicarrier modulation in which different data signals are provided with different transmission delays and reliabilities.

The entire disclosure of each of these applications is hereby incorporated herein by reference.

BACKGROUND OF THE INVENTION

The principles of multicarrier modulation are described for example in "Multicarrier Modulation For Data Transmission: An Idea Whose Time Has Come" by John A. C. Bingham, IEEE Communications Magazine, Vol. 28, No. 5, pages 5-14, May 1990. As is known, in a transmission system using multicarrier modulation, FDM (frequency division multiplexed) carriers spaced within a usable frequency band of a transmission channel, forming a set of subchannels, are modulated at a block or symbol transmission rate of the system. The bits of input data for transmission within each block or symbol period are allocated to the carriers or subchannels in a manner which is dependent upon the signal-to-noise ratios (SNRs) of the carriers or subchannels, typically so that the bit error rates of the subchannels, as monitored at the receiver, are substantially equal. As a result, the different subchannels carry different numbers of bits in each symbol period. With an appropriate allocation of bits and transmit powers to the carriers or subchannels, such a system provides a desirable performance.

Over a period of time during normal operation of a transmission system using multicarrier modulation, especially with changes in temperature and traffic changes on adjacent transmission channels, the SNRs of the carriers or subchannels will vary. In consequence, regardless of how the allocation of bits to carriers is initially established, it is desirable to update the allocations during operation of the system. This invention is concerned with such updating.

In the Chow et al. application referred to above, the receiver monitors a parameter such as the SNR of each subchannel and, in dependence upon the results of such monitoring, sends (via one direction of an operations control channel) bit swap information to the transmitter when it determines that a change in bit allocations is desirable. The transmitter sends (via an opposite direction of the operations control channel) an acknowledgement of the bit swap information back to the receiver, and it is proposed that the change in the bit allocations take place a fixed number of transmitted symbols following the acknowledgement. While this proposed so-called handshaking procedure is simple, it has disadvantages in practice which render it unreliable. In particular, errors in the handshaking procedure can cause the bit allocations to be changed on the occurrence of different symbols at the transmitter and the receiver, or to be changed at the transmitter and not at the receiver, or vice versa, leading to large numbers of errors in the transmitted data.

As the operation of the multicarrier modulation system is based on the allocation of bits to carders being coordinated between the transmitter and the receiver, it is essential that a reliable procedure be used for updating of the allocation of bits to carders.

An application of a transmission system using multicarrier modulation is an ADSL (asymmetric digital subscriber line) arrangement. For example, an article by S. Fleming et at. entitled "ADSL: The on-ramp to the information highway", Telephony, Jul. 12, 1993, pages 20–26 describes an ADSL arrangement applied to a two-wire telephone subscriber line, in which four asymmetric 1.5 Mb/s channels are provided for transmission in a downstream direction from a telephone CO (central office) to a subscriber, in addition to various data channels and POTS (plain old telephone service) carded symmetrically (i.e. bidirectionally) on the fine. The data channels for example comprise an ISDN (integrated services digital network) HO channel at 384 kb/s or an ISDN basic access channel at 144 kb/s, and a control channel for example at a bit rate of 16 kb/s. The asymmetric channels provide a total bandwidth of 6 Mb/s which can be used for digital video signals. These channels are in addition to the bidirectional operations control channel referred to above for communications between the transmitters and receivers of the system.

An object of this invention is to provide an improved method of updating allocations of bits to carriers in a transmission system using multicarrier modulation.

SUMMARY OF THE INVENTION

According to one aspect of this invention there is provided a method of changing a parameter of a transmission system using multicarrier modulation, comprising the steps of: identifying symbols transmitted by the system by a symbol count; communicating between a transmitter and a receiver of the system information identifying a change in said parameter and a symbol count value for implementing said change; implementing said change at the transmitter in response to a transmitted symbol having a symbol count matching said value; and implementing said change at the receiver in response to a received symbol having a symbol count matching said value.

The parameter can comprise a number of bits per symbol allocated to a subchannel and/or a signal power of a subchannel of the system.

Preferably the step of identifying symbols comprises maintaining a count identifying transmitted symbols at the transmitter and maintaining a count identifying received symbols at the receiver. Conceivably, however, each symbol could instead or additionally be identified by transmission of the symbol count as part of the symbol itself, this involving relatively little overhead because the number of bits per symbol can be very much greater than the number of bits required for a symbol count.

According to another aspect this invention provides a method of updating bit allocations to subchannels in a transmission system using multicarrier modulation, comprising the steps of: maintaining a count identifying transmitted symbols at a transmitter of the system; maintaining a synchronized count identifying received symbols at a receiver of the system; communicating between the transmitter and the receiver information identifying a change of bit allocations to subchannels and a symbol count value; implementing the change at the transmitter in response to the count identifying transmitted symbols matching the symbol count value; and implementing the change at the receiver in response to the count identifying received symbols matching the symbol count value.

Preferably the counts at the transmitter and receiver are synchronized by the steps of: transmitting symbols in accordance with a predetermined criterion from the transmitter and setting the count at the transmitter to a predetermined state in dependence upon such transmission; and detecting received symbols satisfying the predetermined criterion at the receiver and setting the count at the receiver to the predetermined state in dependence upon such detection. The predetermined criterion conveniently comprises a negation between two consecutive symbols.

The step of communicating preferably comprises sending a request for a change from the receiver to the transmitter, the request identifying at least one subchannel of the system and a change in a bit allocation relating to that subchannel, and sending the symbol count value for implementing the change from the transmitter to the receiver in response to the request. For reliability, preferably the request and the symbol count value are each sent a plurality of times.

Advantageously, the request identifies two subchannels for making complementary changes in the numbers of bits per symbol allocated thereto, for example an increase in the bit allocation of one subchannel by one bit per symbol and a decrease in the bit allocation of another subchannel by one bit per symbol. The method preferably includes the step of monitoring performance (for example, mean squared error) of subchannels at the receiver and determining the request for a change at the receiver in dependence upon the monitoring.

The invention also provides a transmission system using multicarrier modulation, comprising: a transmitter including a modulator for modulating multiple carriers each with an individually allocated number of dam bits per transmission symbol, the transmitter including a transmitted symbol counter for counting transmitted symbols and a control unit for updating a number of data bits allocated to a carder at a time dependent upon a count of the transmitted symbol counter; and a receiver including a demodulator for demodulating the carders to derive the allocated numbers of data bits from the multiple carriers, the receiver including a received symbol counter for counting received symbols and a control unit for updating a number of dam bits derived from a carder at a time dependent upon a count of the received symbol counter.

BRIEF DESCRIPTION OF THE DRAWINGS

The invention will be further understood from the following description with reference to the accompanying drawings, in which.

DETAILED DESCRIPTION

Figure 1:
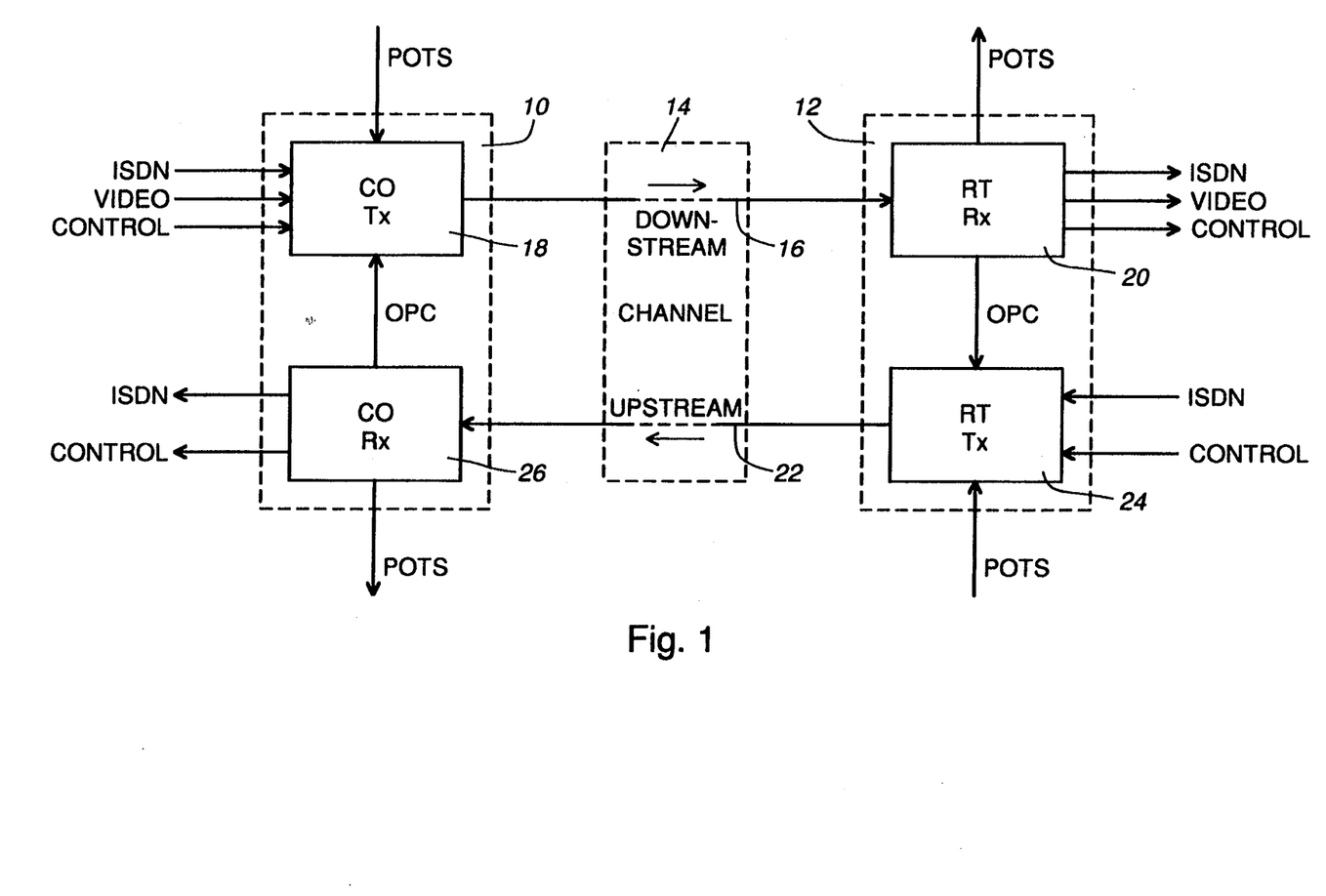
FIG. 1 illustrates a block diagram of an ADSL transmission system using multicarrier modulation in accordance with an embodiment of this invention.

Referring to FIG. 1, an ADSL transmission system comprises a telephone central office (CO) transceiver 10 and remote terminal (RT) transceiver 12, linked via a channel 14 providing a downstream transmission path 16, from a downstream transmitter (Tx) 18 in the CO to a downstream receiver (Rx) 20 in the RT, and an upstream transmission path 22 from an upstream transmitter 24 in the RT to an upstream receiver 26 in the CO.

Signals transmitted in the downstream direction are indicated by way of example as comprising digital video, ISDN, control, and POTS signals, and signals transmitted in the upstream direction are indicated by way of example as comprising ISDN, control, and POTS signals; other types of data may be transmitted in a similar manner. The system is asymmetric in that the video signals, which require a large bandwidth of for example 6 Mb/s as already discussed, are transmitted only in the downstream direction. The other signals, transmitted in both directions, require a much smaller bandwidth. In addition to these signals, an operations control channel (OPC) provides for transmission in both directions on the channel 14 between the transceivers 10 and 12 of control signals required for operation of the transceivers as described below.

The channel 14 is for example a two-wire telephone subscriber line on which the POTS signals are transmitted in a low frequency band below about 10 kHz and on which the other signals are transmitted by multicarrier modulation at higher frequencies. The downstream and upstream signals can be separated by frequency division multiplexing or using echo cancellation techniques.

Figure 2:
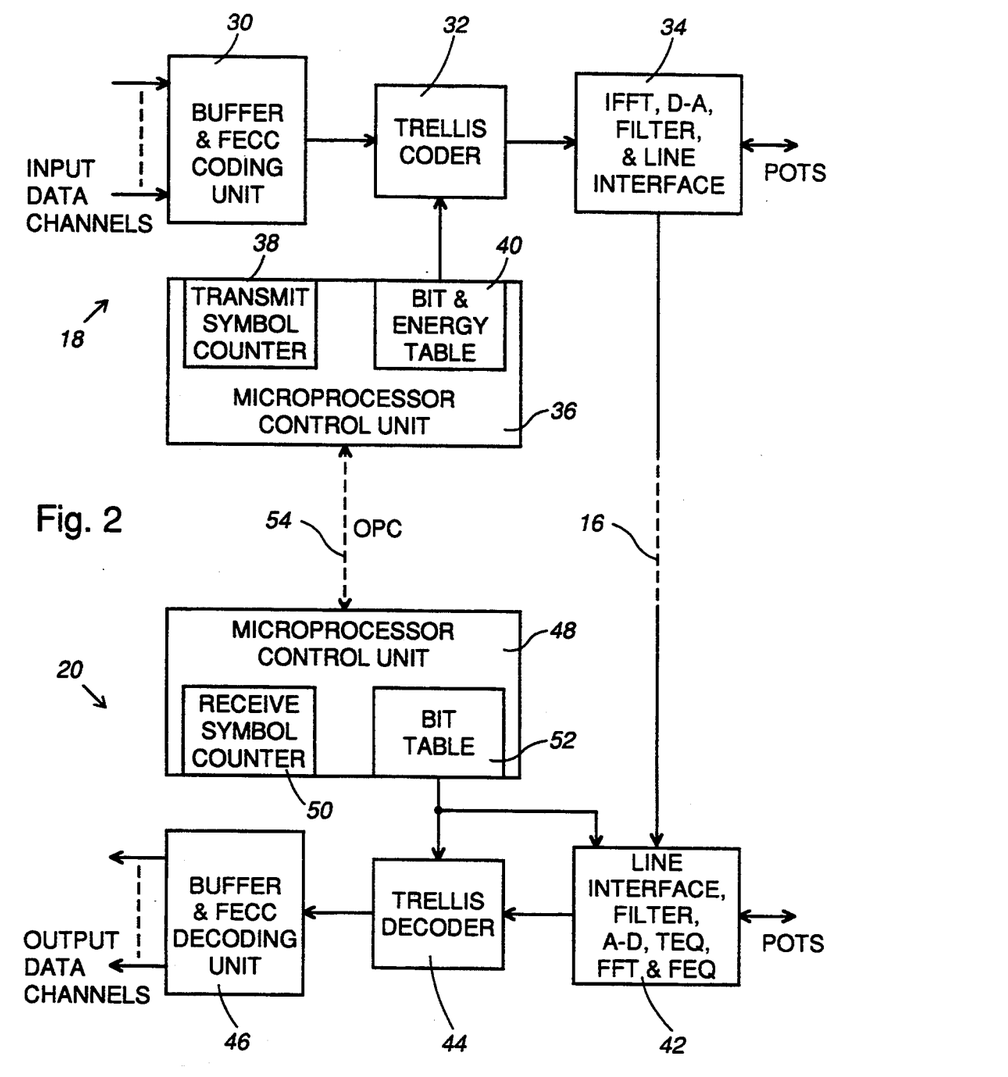
FIG. 2 illustrates a functional block diagram of a downstream transmitter, provided at a telephone CO, and a downstream receiver, provided at a subscriber's premises, of the system of FIG. 1.

Referring to FIG. 2, the downstream transmitter 18 functionally comprises a buffer and FECC (forward error correcting code) coding unit 30, a trellis coder 32, a unit 34 comprising an Inverse Fast Fourier Transform (IFFI) apparatus, digital-m-analog (D-A) converter, analog filter, and a line interface, and a microprocessor control unit 36 which includes a transmit symbol counter 38 and a bit and energy allocation table 40. The downstream receiver 20 functionally comprises a unit 42 comprising a line interface, analog filter, analog-to-digital (A-D) converter, a time domain equalizer (TEQ), FFT apparatus, and a frequency domain equalizer (FEQ), a trellis decoder 44, a buffer and FECC decoding unit 46, and a microprocessor control unit 48 which includes a receive symbol counter 50 and a bit allocation table 52. FIG. 2 also shows the downstream transmission path 16 extending from the unit 34 to the unit 42, and for simplicity represents by a broken line 54 the bidirectional communications path provided by the operations control channel (OPC) between the control units 36 and 48. It should be appreciated that this channel is actually provided on the paths 16 and 22, as described above with reference to FIG. 1, data on the OPC being processed in a similar manner to data on the other channels.

Data signals from a plurality of input dam channels, for example constituted by the video, ISDN, control, and OPC signals represented in FIG. 1, are buffered and subjected to FECC coding and codeword interleaving in the unit 30. In each symbol period, for each carder or subchannel a number of bits determined from the table 40 are supplied from the unit 30 to the trellis coder 32. The coder 32 implements trellis coding and converts these data bits into complex amplitudes, scaled in accordance with a scaling factor also determined from the table 40, which it supplies to the IFFT apparatus in the unit 34. The units 34 and 42 couple the resulting signals in frequency division multiplexed form at frequencies above about 10 kHz via the path 16, together with the POTS telephone signals below 10 kHz. In the receiver 20, in each symbol period for each carder or subchannel, complex amplitudes produced by the FFT apparatus and FEQ in the unit 42 are converted by the trellis decoder 44, operating in accordance with the Viterbi algorithm to perform maximum likelihood sequence estimation in known manner, to a number of codeword bits determined from the table 52. The unit 46 effects deinterleaving, decoding, and buffering conversely to the unit 30 to reproduce the data signals on the output data channels.

Particular details of the units 30 to 34 and 42 to 46 are not significant to the present invention, and accordingly these units are not described further here. Details of the forms which these units can take are known in the art and are described in the related applications referred to above. It is observed that, while preferred, the use of trellis coded modulation is not essential to the invention. Accordingly the trellis coder 32 may be replaced by simpler apparatus for convening data bits into scaled complex amplitudes without any trellis coding, with a complementary replacement of the trellis decoder 44. Similarly, the use of FECC coding is not essential to the invention, and the FECC coding and decoding units can be omitted.

Figure 3:
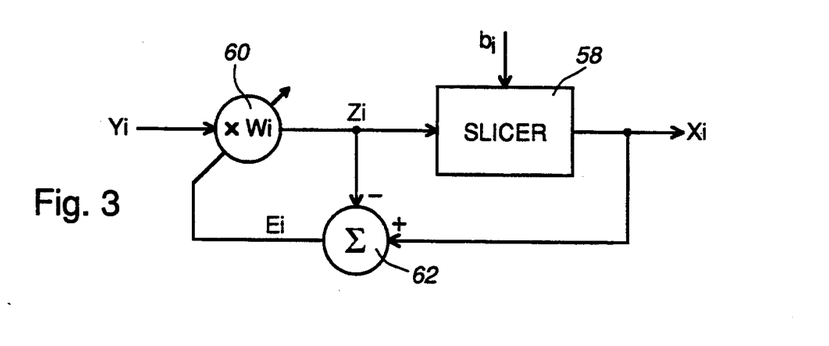
FIG. 3 illustrates a functional block diagram of a frequency domain equalizer (FEQ) provided in the downstream receiver.

FIG. 3 illustrates the operation of the FEQ (frequency domain equalizer), which is provided at the output of the FFT apparatus in the unit 42, in conjunction with a slicer 58. The FEQ operates individually on each subchannel to adaptively adjust for the attenuation and phase of each carrier. The slicer 58 is supplied from the bit allocation table 52 with the number of bits $b_i$ used for each cattier or subchannel i in order to determine an appropriate subset of decision levels for its slicing operation.

Referring to FIG. 3, in each symbol period the complex amplitude of a signal Yi produced by the FFT for each carder i is multiplied in a multiplier 60 by a complex multiplier Wi for this carrier to produce an equalized product Zi, from which the slicer 58 produces a decoded binary signal Xi having the allocated number of bits $b_i$. A summer 62 produces an error signal Ei from a difference between the product Zi and the binary signal Xi, which error signal is used adaptively in known manner to adjust the multiplier Wi to minimize the error signal over time.

The FEQ, and other units of the system, can be implemented in hardware but is preferably implemented by programming of microprocessors such as a digital signal processor.

By way of example, it is observed that the transmission system may have up to 256 carriers with a frequency spacing of 4 kHz, the discrete Fourier transform accordingly having a length of N=512, with a symbol period of 250 µs and about 1700 bits per symbol to provide a total transmission rate of about 6.8 Mb/s, with each carrier or subchannel carrying a number of bits in each symbol period which depends on the signal to noise ratio, or SNR, of the subchannel. The number of bits carded by each subchannel in each symbol period can be zero (i.e. the subchannel is not being used) or can vary from a minimum number, for example 1 or 2 bits, to a maximum number, for example in a range from 10 to 16 bits. Because the subchannels carry variable numbers of bits, the total transmission rate of the system is not fixed but can be increased (resulting in reduced SNR) or decreased (resulting in increased SNR) to meet particular requirements. The OPC can conveniently comprise 4 bits in each symbol period, providing a transmission rate of 16 kb/s.

As is known, the allocation of the number of bits $b_i$ to be used for each carrier or subchannel i must be the same in the table 52 at the receiver as in the table 40 at the transmitter. The numbers $b_i$ stored in these tables can initially be set up in any desired manner, for example in accordance with a predetermined set of values or in a manner as described in the related patent application by Peter S. Chow et al. referred to above.

During normal operation of the transmission system, especially with changes in temperature and traffic changes on adjacent transmission channels, the characteristics of the carriers or subchannels will vary, so that regardless of how the allocation of bits to carriers is initially established, it is desirable to update the allocations of bits to carriers.

The related patent application by Peter S. Chow et al. indicates the desirability of updating of the tables and suggests how this might be done. In particular, that application discloses monitoring the mean squared error (MSE) of each subchannel, detecting the greatest and least MSEs among the subchannels, and, if the greatest MSE exceeds twice the least MSE, reallocating one bit per symbol period from the subchannel having the greatest MSE to the subchannel having the least MSE, this being referred to as a bit swap.

The related patent application proposes that the bit swap, involving an updating of the bit allocations in the tables at the transmitter and receiver, be synchronized through a simple handshake procedure, in which the receiver sends a bit swap message to the transmitter, the transmitter sends an acknowledgement to the receiver, and the transmitter and receiver both effect the bit swap a fixed number of symbols following the acknowledgement. However, this handshake procedure is not sufficiently reliable in practice, and can lead to discrepancies between the bit allocations in the tables at the transmitter and the receiver. As the proper operation of the transmission system requires identity of the bit allocations in the tables 40 and 52, and optimal operation of the system necessitates updating of the allocations, it is important to provide a highly reliable method for effecting such updating.

In addition, it is desirable to provide a more versatile procedure for updating of the tables 40 and 52 than that disclosed by the related patent application. For example, in the related patent application, if a particular subchannel is not used (i.e. is allocated zero bits) in the initialization of the system, then it will also not be used subsequently regardless of its subsequent suitability for use. In addition, it is desirable for the system, and hence the updating of the tables 40 and 52, to be able to accommodate changes in the overall transmission rate, or total number of bits per symbol period. In this respect it will be recalled that the overall transmission rate of the system is not fixed, but can be increased or decreased with a corresponding decrease or increase in SNR.

In accordance with this embodiment of the invention, the transmitter control unit 36 includes the counter 38, which it increments immediately after the transmission of each symbol, and the receiver control unit 48 includes the counter 50, which it increments immediately after the reception of each symbol. The counters 38 and 50 have the same size, for example they may be 16 bit counters, so that their count capacity is greater than the signal delay, in symbol periods, of the transmission system. The counters are initially synchronized for example as described below, so that their counts identify the same symbol at the transmitter and the receiver. It should be appreciated that, due to the signal delays for example in the IFFT and FFT apparatus, the synchronism between the counters 38 and 50 refers to the symbols being transmitted and received; the count of the receive symbol counter 50 will always lag in time behind that of the transmit symbol counter 38.

By way of example, as part of the initialization process of the system the control unit 36 can control the transmitter 18 to transmit two consecutive symbols the second of which is the negative of the first (i.e. if the first symbol has a waveform of f(t), then the second symbol has a waveform of −f(t)), resetting the transmit symbol counter to a count of zero immediately after the transmission of the second symbol. The control unit 48 can easily detect the occurrence of such a negation between consecutive symbols, in response to which it resets the receive symbol counter to a count of zero immediately after reception of the second symbol, whereby the two counters are synchronized.

As part of the initialization process, the transmitter control unit 36 sets up an initial set of bit allocations and energy scale factors in the table 40, and the control unit 48 sets up an identical set of bit allocations in the table 52. The bit allocations can for example be set up in a manner as described in the related patent application by Peter S. Chow et al., or can more simply be set to predetermined values. In either case, these bit allocations will be adapted over time to achieve and maintain a reasonably optimum set of bit allocations for the prevailing characteristics of the transmission channel and the desired overall transmission rate of the system. If the initialization simply uses predetermined values for the bit allocations, an initial adaptation of these bit allocations will take place relatively quickly to adjust the bit allocations to the prevailing characteristics of the particular transmission channel which is being used.

As already mentioned, zero bits (of the dam from the unit 30) may be allocated for one or more carriers or subchannels; thus in the tables 40 and 52 $b_i=0$ for any such unused subchannel. Optionally, in order to facilitate monitoring and subsequent use of such a subchannel, in response to the value $b_i=0$ for a subchannel i, in each symbol period the trellis coder 32 operates on a predetermined signal, for example a constant value corresponding to a low signal amplitude for relatively low power consumption. This permits operation of the FEQ on the unused subchannel in the same manner as for subchannels used for data from the unit 30.

Figure 4:
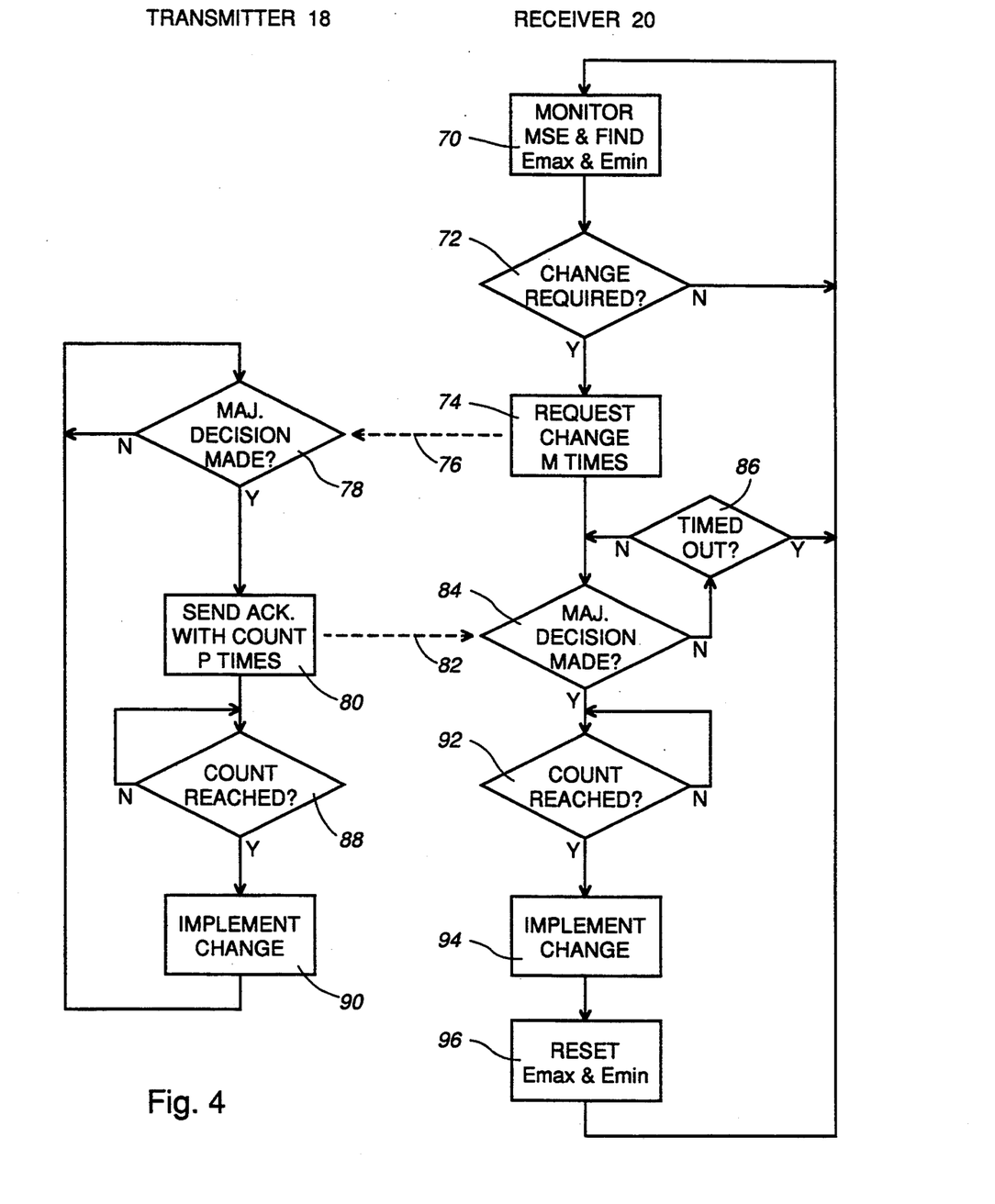
FIG. 4 is a flow chart diagram with reference to which operations in the downstream transmitter and downstream receiver are described.

FIG. 4 illustrates in a flow chart operations, carded out as background tasks, related to updating of the table 40 in the downstream transmitter 18, shown on the left side of FIG. 4, and updating of the table 52 in the downstream receiver 20, shown on the right side of FIG. 4.

As shown by a block 70 in FIG. 4, the control unit 48 in the receiver 20 monitors the mean squared error or MSE of each subchannel, and periodically (for example every 500 symbols, or 125 ms) searches through the MSEs of all of the subchannels to determine the largest MSE, Emax, and the smallest MSE, Emin as well as the indices i of the subchannels to which these MSEs relate. For convenience, these indices are referred to as Imax and Imin respectively. The MSE(i,j) of each subchannel i at the time of a symbol j is determined using exponential averaging in accordance with the equation:

$$MSE(i,j)=\lambda MSE(i,j-1)+(1-\lambda)E_i^2$$

where MSE(i,j−1) is the MSE of the subchannel i at the time of the previous symbol j−1, $E_i^2$ is the magnitude squared of the complex decision error Ei produced at the output of the summer 62 of the FEQ as shown in FIG. 3, and $\lambda$ is a predetermined positive constant less than one. Typically $\lambda$ is in the range from 0.95 to 0.99, values closer to one corresponding to a longer averaging period.

In a subsequent decision block 72, the control unit 48 determines whether a change in bit allocations is required. One criterion for a change in bit allocations is in order to effect an increase or decrease in the overall dam transmission rate of the system. Such a desired change in the overall transmission rate can be determined at the receiver 20 itself, or can be communicated to the receiver 20 from the transmitter 18 via the OPC or another control channel.

Another criterion for a change in the bit allocations is in the event that Emax is greater than k times Emin, where k is a predetermined constant. This criterion can be satisfied immediately following initialization to a predetermined set of values as mentioned above, or as a result of changes over time during normal operation of the transmission system. In this case a bit swap is desirable in order to move one bit per symbol period from the subchannel Imax to the subchannel Imin, thereby more nearly equalizing the errors on the subchannels and improving the overall SNR of the system. The value of k is selected to be sufficiently large to avoid excessively frequent bit swaps and sufficiently small for effective equalization of the performance of the subchannels; for example it may be in a range from 2 to 4.

Other criteria may also be used for instigating a change in bit allocations as determined at the block 72, for example for testing purposes or to force a particular subchannel to be unused or to be used to carry a particular number of bits per symbol.

If in the block 72 it is determined that no change in bit allocations is required, then a return is made to the block 70. If it is determined that a change is required, then a block 74 is reached in which the control unit 48 in the receiver 20 sends via the OPC a request for a change to the transmitter 18. The same request is sent redundantly M times, where M is a plural integer, preferably odd; for example M=5.

Communications via the OPC can take any desired form. For example and as is assumed here, this channel can simply carry serial data consisting of all zeroes in the absence of a request for change message or other messages on the OPC. The request for change message in this case can comprise a header consisting of a sequence of 12 ones (this bit pattern being selected because it otherwise does not occur), followed by a first four-bit command and a related eight-bit subchannel index i (eight bits being sufficient to identify any of the 256 subchannels) and a second four-bit command and a related subchannel index. Each of the four-bit commands can have any value (the value 1111 is not used in order to maintain a clear distinction from the header) with predetermined interpretations for example as indicated below. The first subchannel index in the message identifies a subchannel on which the MSE is to be decreased, and the second subchannel index in the message identifies a subchannel on which the MSE is to be increased. In the case of a bit swap message, these indices will be Imax and Imin respectively.

As the MSE on a subchannel is affected by both the allocated number of bits per symbol and the transmitted power (i.e. signal amplitudes) on the subchannel, the four-bit commands are arranged to permit changes to either of these. In the case of the first command in the message, the following command values and interpretations are used:

| Value | Interpretation |
| --- | --- |
| 0000 | Decrease the allocated number of bits by one |
| 0001 | Increase the transmitted power by a predetermined amount g1 |
| 0010 | Increase the transmitted power by a predetermined amount g2 |
| ... | ... |
| 0111 | Do nothing. |

Correspondingly, the second command in the message can have the following values and interpretations:

| Value | Interpretation |
| --- | --- |
| 0000 | Increase the allocated number of bits by one |
| 0001 | Decrease the transmitted power by a predetermined amount g1' |
| 0010 | Decrease the transmitted power by a predetermined amount g2' |
| ... | ... |
| 0111 | Do nothing. |

Thus a request message of the form 111111111110000 Imax 0000 Imin requests a decrease of one bit per symbol allocated to the subchannel Imax and an increase of one bit per symbol allocated to the subchannel Imin, thus constituting a bit swap request as discussed above. A message of the form 111111111110111 Imax 0000 Imin requests no change in the number of bits allocated to the subchannel Imax and an increase of one bit per symbol allocated to the subchannel Imin, for a transmission rate increase of one bit per symbol or 4 kb/s. A message of the form 111111111110000 Imax 0111 Imin requests a decrease of one bit per symbol allocated to the subchannel Imax and no change in the number of bits allocated to the subchannel Imin, for a transmission rate decrease of one bit per symbol or 4 kb/s. A message of the form 111111111110001 Imax 0001 Imin requests an increase by g1 of the power on the subchannel Imax and a decrease by g1' of the power on the subchannel Imin, and so on. The predetermined amounts g1', g2°, etc. can be the same as, or different from, the predetermined amounts g1, g2, etc.

Referring again to FIG. 4, a dashed line 76 represents the redundant transmission of the request message from the receiver 20 to the transmitter 18 via the OPC. As shown by a decision block 78, the control unit 36 in the transmitter 18 waits until the number M of requests have been received, and then performs a majority decision on the message to determine its contents with a high degree of reliability. The request message is subjected to the FECC coding, codeword interleaving, and trellis coding of the system, so that its reliability also benefits from these.

On interpreting the request message, as shown by a block 80 and a dashed line 82 the control unit 36 in the transmitter 18 returns an acknowledgement via the OPC to the control unit 48 in the receiver 20. As for the request message, the acknowledgement is transmitted repeatedly a total number P times, where P is a plural integer, preferably odd; for example P=5. The acknowledgement comprises a header constituted by a sequence of twenty ones, followed by a sequence of four zeros and a counter value of sixteen bits corresponding to the size of the transmit and receive symbol counters 38 and 50.

The counter value transmitted in the acknowledgement represents the symbol count immediately after which the requested change will be effected, and is determined by the control unit 36 by adding to the current count of the transmit symbol counter 38 an offset which is greater than the transmission and message processing delays in the system. For example, the delays may be of the order of 256 symbols, and the offset may be two or three times this.

After sending the request message, as shown by a decision block 84, the control unit 48 in the receiver 20 waits until the number P of acknowledgements have been received, and then performs a majority decision on the acknowledgements to determine the transmitted counter value with a high degree of reliability. As for the request message, the acknowledgement is subjected to the FECC coding, codeword interleaving, and trellis coding of the system. A timeout decision block 86 is also provided so that, in the event that the acknowledgements are not received within a predetermined timeout period (for example corresponding to 65,536 symbols), a return is made to the block 70. Although not illustrated in FIG. 4, this path may also include procedures for recovering from transmission errors.

In the transmitter 18, as shown by a block 88 the control unit 36 waits until the transmit symbol counter 38 reaches the counter value determined as described above, and immediately after transmission of this symbol effects the requested change as represented by a block 90, then returning to the block 78 to wait for another request. Similarly, in the receiver 20, as shown by a block 92 the control unit 48 waits until the receive symbol counter 50 reaches the counter value transmitted in the acknowledgement, and immediately after receipt of this symbol effects the requested change as represented by a block 94. As shown by a block 96 the control unit 48 resets the values of Emax and Emin so that the subsequent determination of new values will be correct, and then returns to the monitoring block 70.

The implementation of the requested change represented by the blocks 90 and 94, which is accurately and reliably synchronized between the transmitter and receiver by the procedure described above, comprises:

In the event that one or more bit allocations is being changed, updating of the bit allocations stored in the tables 40 and 52, with consequent changes in the energy scaling factors stored in the table 40 used by the transmitter and in the decision levels used by the slicer 58 in the receiver, for the identified subchannel(s);

In the event that the transmitted energy of one or more carriers is being changed, updating of the energy scaling factors stored in the table 40 by the factor $\sqrt{g}$ (where g is the predetermined amount g1, g2, etc., and the square root arises because g represents an energy whereas the scaling factors in the table 40 operate on amplitudes), rescale the coefficient Wi in the FEQ (FIG. 3) by the inverse factor $1/\sqrt{g}$, and scale the current value of the MSE by the factor $1/g$, for the identified subchannel(s).

The resetting of the values Emax and Emin indicated by the block 96 can, in the case of a bit swap, conveniently comprise halving the current value of the MSE for the subchannel Imax and doubling the current value of the MSE for the subchannel Imin. In the case of the transmitted energy of one or more of the carders being changed, the current value of the MSE of each affected subchannel can be adjusted in accordance with its energy change.

The above procedure thus provides a highly reliable and accurate mechanism for communicating and synchronizing changes in bit allocations and energy scaling factors between the transmitter and receiver. In the event that, even with this procedure, errors occur, these can be detected and corrected by further communications between the transmitter and receiver. For example, if a subchannel identified in a request message subsequently has an unusually high MSE, or if there is a dramatic increase in the bit error rate detected through the FECC decoding, then the receiver can transmit a message to the transmitter to effect a switch to a previous set of bit and energy allocations.

Thus although a particular embodiment of the invention has been described in detail, it should be appreciated that numerous modifications, variations, and adaptations may be made without departing from the scope of the invention as defined in the claims.

For example, messaging procedures other than that described above, such as an ACK/NACK (acknowledgement/negative acknowledgement) scheme, can be used between the transmitter and receiver for reliable communication of the necessary information, and other forms of the request and acknowledgement messages may be used. Changes may also be initiated by the transmitter, for example in order to effect changes in the transmitted data rate, and the messaging procedures can be modified to facilitate this.

In addition, the transmit and receive symbol counters need not be incremented once for each symbol, but instead could for example be incremented after every N symbols, where N is an integer greater than one; for example N=68. In this case the implementation of the changes is similarly determined in relation to the counts, for example coincident with the boundaries between groups of N symbols.

What is claimed is:

1. A method of changing a parameter of a transmission system using multicarrier modulation, comprising the steps of:
   identifying symbols transmitted by the system by a symbol count;
   communicating between a transmitter and a receiver of the system information identifying a change in said parameter and a symbol count value for implementing said change;
   implementing said change at the transmitter in response to a transmitted symbol having a symbol count matching said value; and
   implementing said change at the receiver in response to a received symbol having a symbol count matching said value.

2. A method as claimed in claim 1 wherein the parameter comprises a number of bits per symbol allocated to a subchannel of the system.

3. A method as claimed in claim 1 wherein the parameter comprises a signal power of a subchannel of the system.

4. A method as claimed in claim 1 wherein the step of identifying symbols comprises maintaining a count identifying transmitted symbols at the transmitter and maintaining a count identifying received symbols at the receiver.

5. A method as claimed in claim 4 and comprising synchronizing the counts at the transmitter and receiver by the steps of:
   transmitting symbols in accordance with a predetermined criterion from the transmitter and setting the count at the transmitter to a predetermined state in dependence upon such transmission; and
   detecting received symbols satisfying the predetermined criterion at the receiver and setting the count at the receiver to the predetermined state in dependence upon such detection.

6. A method as claimed in claim 5 wherein the predetermined criterion comprises a negation between two consecutive symbols.

7. A method as claimed in claim 1 wherein the step of communicating comprises sending a request for a change from the receiver to the transmitter, the request identifying at least one subchannel of the system and a change in a parameter relating to that subchannel, and sending the symbol count value for implementing the change from the transmitter to the receiver in response to the request.

8. A method as claimed in claim 7 wherein the request and the symbol count value are each sent a plurality of times.

9. A method as claimed in claim 7 wherein the parameter comprises a number of bits per symbol allocated to a subchannel and the request identifies two subchannels for making complementary changes in the numbers of bits per symbol allocated thereto.

10. A method as claimed in claim 9 and including the step of monitoring performance of subchannels at the receiver and determining the request for a change at the receiver in dependence upon the monitoring.

11. A method as claimed in claim 1 and including the step of monitoring performance of subchannels of the system at the receiver and determining a request for a change in a parameter of the system at the receiver in dependence upon the monitoring.

12. A method of updating bit allocations to subchannels in a transmission system using multicarrier modulation, comprising the steps of:
   maintaining a count identifying transmitted symbols at a transmitter of the system;
   maintaining a synchronized count identifying received symbols at a receiver of the system;

communicating between the transmitter and the receiver information identifying a change of bit allocations to subchannels and a symbol count value;

implementing the change at the transmitter in response to the count identifying transmitted symbols matching the symbol count value; and implementing the change at the receiver in response to the count identifying received symbols matching the symbol count value.

13. A method as claimed in claim 12 and comprising synchronizing the counts at the transmitter and receiver by the steps of:

transmitting symbols in accordance with a predetermined criterion from the transmitter and setting the count at the transmitter to a predetermined state in dependence upon such transmission; and detecting received symbols satisfying the predetermined criterion at the receiver and setting the count at the receiver to the predetermined state in dependence upon such detection.

14. A method as claimed in claim 13 wherein the predetermined criterion comprises a negation between two consecutive symbols.

15. A method as claimed in claim 12 wherein the step of communicating comprises sending a request for a change from the receiver to the transmitter, the request identifying at least one subchannel of the system and a change in a bit allocation relating to that subchannel, and sending the symbol count value for implementing the change from the transmitter to the receiver in response to the request.

16. A method as claimed in claim 15 wherein the request and the symbol count value are each sent a plurality of times.

17. A method as claimed in claim 15 wherein the request identifies two subchannels for making complementary changes in the numbers of bits per symbol allocated thereto.

18. A method as claimed in claim 17 and including the step of monitoring performance of subchannels at the receiver and determining the request for a change at the receiver in dependence upon the monitoring.

19. A method as claimed in claim 12 and including the step of monitoring performance of subchannels of the system at the receiver and determining a request for updating bit allocations to subchannels at the receiver in dependence upon the monitoring.

20. A transmission system using multicarrier modulation, comprising:

a transmitter including a modulator for modulating multiple carriers each with an individually allocated number of data bits per transmission symbol, the transmitter including a transmitted symbol counter for counting transmitted symbols and a control unit for updating a number of data bits allocated to a carrier at a time dependent upon a count of the transmitted symbol counter; and a receiver including a demodulator for demodulating the carriers to derive the allocated numbers of data bits from the multiple carders, the receiver including a received symbol counter for counting received symbols and a control unit for updating a number of data bits derived from a carder at a time dependent upon a count of the received symbol counter.

* * * * *